US010933366B2

(12) United States Patent
Park et al.

(10) Patent No.: US 10,933,366 B2
(45) Date of Patent: Mar. 2, 2021

(54) PRESSURE SWING ADSORPTION PROCESS AND PRESSURE SWING ADSORPTION APPARATUS

(71) Applicant: KOREA INSTITUTE OF ENERGY RESEARCH, Daejeon (KR)

(72) Inventors: Jong-ho Park, Daejeon (KR); Hee-tae Beum, Daejeon (KR); Sang-sup Han, Daejeon (KR); Dong-woo Cho, Daejeon (KR); Kanghee Cho, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 215 days.

(21) Appl. No.: 16/193,323

(22) Filed: Nov. 16, 2018

(65) Prior Publication Data

US 2019/0151790 A1   May 23, 2019

(30) Foreign Application Priority Data

Nov. 17, 2017   (KR) .................. 10-2017-0154120

(51) Int. Cl.
*B01D 53/047* (2006.01)
*B01D 53/053* (2006.01)
(Continued)

(52) U.S. Cl.
CPC ......... *B01D 53/047* (2013.01); *B01D 53/053* (2013.01); *C01B 3/34* (2013.01);
(Continued)

(58) Field of Classification Search
CPC ............... B01D 53/047; B01D 53/053; B01D 2253/102; B01D 2253/108;
(Continued)

(56) References Cited

U.S. PATENT DOCUMENTS 4,589,888 A * 5/1986 Hiscock ............. B01D 53/0473
95/100
4,723,966 A * 2/1988 Fuderer ................ B01D 53/047
95/98

(Continued)

FOREIGN PATENT DOCUMENTS

KR   10-2001-0076171 A   8/2001
KR   10-2009-0005508 A   1/2009
KR   10-2009-0091327 A   8/2009

*Primary Examiner* — Frank M Lawrence, Jr.
(74) *Attorney, Agent, or Firm* — Birch, Stewart, Kolasch & Birch, LLP (57) ABSTRACT

According to an exemplary embodiment of the present invention, a pressure swing adsorption process of a hydrogen production system is provided. The hydrogen production system includes a desulfurization process for removing sulfur components from raw natural gas; a reforming reaction process for producing a reformed gas containing hydrogen generated by the reaction of natural gas through the desulfurization process and steam; and a pressure swing adsorption process of concentrating the hydrogen using a pressure swing adsorption from the reformed gas. In a desorption step of the pressure swing adsorption process, a cocurrent depressurization and a countercurrent depressurization are simultaneously performed.

9 Claims, 5 Drawing Sheets (51) Int. Cl.
    *C01B 3/56*   (2006.01)
    *C01B 3/34*   (2006.01)

(52) U.S. Cl.
    CPC .......... *C01B 3/56* (2013.01); *B01D 2253/102*
    (2013.01); *B01D 2253/108* (2013.01); *B01D*
    *2256/16* (2013.01); *B01D 2257/502* (2013.01);
    *B01D 2257/504* (2013.01); *B01D 2257/7025*
    (2013.01); *B01D 2259/404* (2013.01); *B01D*
    *2259/40028* (2013.01); *B01D 2259/40037*
    (2013.01); *B01D 2259/40045* (2013.01); *B01D*
    *2259/40071* (2013.01); *B01D 2259/40075*
    (2013.01); *B01D 2259/40079* (2013.01); *B01D*
    *2259/40081* (2013.01); *B01D 2259/4145*
    (2013.01); *C01B 2203/0216* (2013.01); *C01B*
    *2203/0425* (2013.01); *C01B 2203/127*
    (2013.01); *C01B 2203/1241* (2013.01)

(58) Field of Classification Search
    CPC .......... B01D 2256/16; B01D 2257/502; B01D
    2257/504; B01D 2257/7025; B01D
    2259/40028; B01D 2259/40037; B01D
    2259/40045; B01D 2259/40071; B01D
    2259/40075; B01D 2259/40079; B01D
    2259/40081; B01D 2259/404; B01D
    2259/4145; C01B 3/34; C01B 3/56; C01B
    2203/0205; C01B 2203/0216; C01B
    2203/0283; C01B 2203/0425; C01B
    2203/047; C01B 2203/0475; C01B
    2203/048; C01B 2203/1241; C01B
    2203/127
    USPC .............. 95/96–98, 100–103, 139, 140, 143;
    96/121
    See application file for complete search history.

(56) References Cited

U.S. PATENT DOCUMENTS

| | | | | |
|---|---|---|---|---|
| 4,770,676 | A | * | 9/1988 | Sircar ................ B01D 53/0462 95/101 |
| 4,969,935 | A | * | 11/1990 | Hay ..................... B01D 53/047 95/130 |
| 5,702,504 | A | * | 12/1997 | Schaub .............. B01D 53/0476 95/101 |
| 6,007,606 | A | * | 12/1999 | Baksh .................. B01D 53/053 95/98 |
| 6,245,127 | B1 | * | 6/2001 | Kane .................. B01D 53/0446 95/101 |
| 6,340,382 | B1 | | 1/2002 | Baksh et al. |
| 9,381,460 | B2 | * | 7/2016 | Weist, Jr. ............. B01D 53/047 |
| 2006/0254425 | A1 | * | 11/2006 | Baksh ..................... B01J 20/20 96/132 |
| 2010/0089233 | A1 | | 4/2010 | Pirngruber et al. |
| 2011/0005391 | A1 | | 1/2011 | Cho et al. |

\* cited by examiner

FIG. 1

| time | (1) | | | | (2) | | | | (3) | | | | (4) | | | |
|---|---|---|---|---|---|---|---|---|---|---|---|---|---|---|---|---|
| | t1 | t2 | t3 | t4 | t1 | t2 | t3 | t4 | t1 | t2 | t3 | t4 | t1 | t2 | t3 | t4 |
| b1 | AD | AD | AD | AD | EQ-1 | PP | PP | EQ-2 | BD | PU | PU+B110 | EQ-2 | EQ-1 | BF | BF | BF |
| b2 | BD | PU | PU+B110 | EQ-2 | EQ-1 | BF | BF | BF | AD | AD | AD | AD | EQ-1 | PP | PP | EQ-2 |
| b3 | EQ-1 | BF | BF | BF | AD | AD | AD | AD | EQ-1 | PP | PP | EQ-2 | BD | PU | PU+B110 | EQ-2 |
| b4 | EQ-1 | PP | PP | EQ-2 | BD | PU | PU+B110 | EQ-2 | EQ-1 | BF | BF | BF | AD | AD | AD | AD |
| B110 | b2,ON | | | | b4,ON | | | | b1,ON | | | | b3,ON | | | |
| B120 | b2,ON | | | | b4,ON | | | | b1,ON | | | | b3,ON | | | |
| Vacuum pump | | b2 | b2 | B120 | | b4 | b4 | B120 | | b1 | b1 | B120 | | b3 | b3 | B120 |

|  | (1) | | | | (2) | | | | (3) | | | | (4) | | | |
|---|---|---|---|---|---|---|---|---|---|---|---|---|---|---|---|---|
| time | t1 | t2 | t3 | t4 | t1 | t2 | t3 | t4 | t1 | t2 | t3 | t4 | t1 | t2 | t3 | t4 |
| b1 | AD | AD | AD | AD | EQ-1 | PP | PP | EQ-2 | BD | PU+B110 | PU | EQ-2 | EQ-1 | BF | BF | BF |
| b2 | BD | PU+B110 | PU | EQ-2 | EQ-1 | BF | BF | BF | AD | AD | AD | AD | EQ-1 | PP | PP | EQ-2 |
| b3 | EQ-1 | BF | BF | BF | AD | AD | AD | AD | EQ-1 | PP | PP | EQ-2 | BD | PU+B110 | PU | EQ-2 |
| b4 | EQ-1 | PP | PP | EQ-2 | BD | PU+B110 | PU | EQ-2 | EQ-1 | BF | BF | BF | AD | AD | AD | AD |
| B110 | b2,ON | | | | b4,ON | | | | b1,ON | | | | b3,ON | | | |
| B120 | b2,ON | | | | b4,ON | | | | b1,ON | | | | b3,ON | | | |
| Vacuum pump | | b2 | b2 | B120 | | b4 | b4 | B120 | | b1 | b1 | B120 | | b3 | b3 | B120 |

PRESSURE SWING ADSORPTION PROCESS AND PRESSURE SWING ADSORPTION APPARATUS

CROSS-REFERENCE TO RELATED APPLICATIONS

This application claims priority under 35 U.S.C. § 119 to Korean Patent Application No. 10-2017-0154120, filed on Nov. 17, 2017, in the Korean Intellectual Property Office, the disclosure of which is incorporated herein by reference in its entirety.

TECHNICAL FIELD

The following disclosure relates to a pressure swing adsorption process and a pressure swing adsorption apparatus for concentrating hydrogen produced in a hydrogen production system through steam reforming of natural gas.

BACKGROUND

Hydrogen may be produced through reforming of natural gas. A hydrogen production system through reforming of natural gas generally includes a desulfurizing apparatus for preliminarily removing sulfur components from a raw material, a reforming reaction apparatus for converting natural gas into hydrogen-rich reformed gas by reacting the natural gas with steam, a water gas shift reaction apparatus for removing carbon monoxide in the reformed gas, and a pressure swing adsorption apparatus for producing high quality hydrogen by removing other impurities and increasing a concentration of hydrogen.

The reformed gas passed through the water gas shift reaction apparatus generally contains about 20% of carbon dioxide ($CO_2$), about 4 to 5% of methane ($CH_4$), and 1 to 4% of carbon monoxide (CO) by volume as main impurities, and hydrogen with a high purity of 99.999% or more may be produced by removing the impurities using pressure swing adsorption.

For example, in an adsorption bed used in such a pressure swing adsorption apparatus, activated carbon is filled in a lower end thereof in which the gas to be purified is introduced and zeolite is filled in an upper end thereof to thereby mainly adsorb and remove carbon dioxide through the activated carbon at a high adsorption pressure and to mainly adsorb and remove methane and carbon monoxide through zeolite.

Conventionally, after an adsorption step is performed, the high purity hydrogen remaining in the adsorption bed through a depressurization process in a cocurrent direction of pressure equalization step and cleaning supplying steps is recovered, and a desorption step was then performed in which the adsorbed impurities are removed through an additional cocurrent depressurization followed by a separate countercurrent depressurization.

Specifically, the desorption step is performed by first performing cocurrent depressurization that performs depressurization in the same direction as a flow direction of a reformed gas introduced into the adsorption bed and then performing a countercurrent depressurization that performs depressurization in a direction opposite to the flow direction of the reformed gas.

The reason is that if the cocurrent depressurization is excessively performed and a pressure of the adsorption bed drops below a certain pressure, the amount of impurities desorbed per unit pressure is large, so that the contamination of the adsorption bed by the desorbed impurities becomes severe and the purity of hydrogen may be lowered.

When a start pressure of the countercurrent depressurization is set to be high in order to reduce the contamination of the adsorption bed due to cocurrent depressurization in the activated carbon layer mainly adsorbing and removing carbon dioxide, high purity hydrogen remaining in a space of a zeolite layer at the time of countercurrent depressurization is not recovered to a final product and is lost.

Therefore, research on a new pressure swing adsorption process that may improve process efficiency by recovering the high purity hydrogen remaining in the zeolite layer while reducing the contamination of the adsorption bed is required.

SUMMARY

An embodiment of the present invention is directed to providing a pressure swing adsorption process capable of improving process efficiency by recovering high purity hydrogen remaining in a zeolite layer which is lost during the conventional process operation and is not recovered to a product to thereby increase a recovery rate while reducing a contamination of an adsorption bed in a desorption step of performing a recovery of residual hydrogen and a desorption of impurities, in the pressure swing adsorption process which is one process of hydrogen production systems through reforming of natural gas.

An embodiment of the present invention is directed to providing a pressure swing adsorption apparatus capable of implementing the pressure swing adsorption process described above.

An embodiment of the present invention provides a pressure swing adsorption process of a hydrogen production system comprising a desulfurization process for removing sulfur components from a raw natural gas; a reforming reaction process for producing a reformed gas containing hydrogen generated by the reaction of the natural gas through the desulfurization process and steam; and a pressure swing adsorption process of concentrating the hydrogen using a pressure swing adsorption from the reformed gas. The pressure swing adsorption process is performed using a plurality of adsorption beds, the pressure swing adsorption process includes: an adsorption step of adsorbing impurities while introducing the reformed gas into a first adsorption bed pressurized with an adsorption pressure to produce a hydrogen product; a first pressure equalization step, a first cleaning and supplying step, a second cleaning and supplying step, and a second pressure equalization step which are sequentially performed after the adsorption step and perform a cocurrent depressurization of the first adsorption bed; and a desorption step which is performed after the second pressure equalization step, depressurizes an internal pressure of the first adsorption bed to a desorption pressure, and performs a recovery of remaining hydrogen and desorption of impurities, and in the desorption step, a cocurrent depressurization and a countercurrent depressurization are simultaneously performed.

In the first pressure equalization step, the first adsorption bed may be in communication with a second adsorption bed which is to be subjected to a pressurization step to pressurize the second adsorption bed, and the first adsorption bed may be cocurrent-depressurized, in the first cleaning and supplying step, the hydrogen gas remaining in the first adsorption bed may be supplied to a third adsorption bed after a completion of the desorption step and the first adsorption bed may be cocurrent-depressurized, in the second cleaning and supplying step, the hydrogen gas remaining in the first adsorption bed and the hydrogen gas recovered in the desorption step may be supplied to the third adsorption bed as a cleaning gas and the first adsorption bed may be cocurrent-depressurized, and in the second pressure equalization step, after the second cleaning and supplying step, only the first adsorption bed and the third adsorption bed may be in communication with each other and the first adsorption bed may be cocurrent-depressurized.

The pressure swing adsorption process may use the adsorption bed in which a lower end thereof, which is a direction into which the reformed gas is introduced, is filled with activated carbon, and an upper end thereof is filled with zeolite.

A depressurization pressure after completion of the first pressure equalization step, the first cleaning and supplying step, the second cleaning and supplying step, and the second pressure equalization may be 10 to 30% of an adsorption pressure.

The cocurrent depressurization and the countercurrent depressurization in the desorption step may be performed at a pressure of 1 to 20% of an adsorption pressure.

The reformed gas may contain 3 to 6% of methane, 1 to 4% of carbon monoxide, 10 to 30% of carbon dioxide, and 65 to 85% of hydrogen by volume.

An another embodiment of the present invention provides a pressure swing adsorption apparatus of a hydrogen production system comprising a desulfurizing apparatus for removing sulfur components from a raw natural gas; a reforming reaction apparatus for producing a reformed gas including hydrogen produced by a reaction of the natural gas through the desulfurizing apparatus and steam; and a pressure swing adsorption apparatus for concentrating the hydrogen using a pressure swing adsorption from the reformed gas. The pressure swing adsorption apparatus includes an adsorption bed and two or more buffer tanks connected to a lower end and an upper end of the adsorption bed, respectively.

The adsorption bed may have a lower end thereof into which the reformed gas is introduced, filled with activated carbon, and an upper end thereof filled with zeolite.

DETAILED DESCRIPTION OF EMBODIMENTS

All terms (including technical and scientific terms) used in the present specification may be used as a meaning which is commonly understood by those skilled in the art to which the present invention pertains, unless otherwise defined. Throughout the present specification, unless explicitly described to the contrary, "comprising" any components will be understood to imply the inclusion of other elements rather than the exclusion of any other elements. Unless explicitly described to the contrary, a singular form includes a plural form.

As described above, a hydrogen production system through reforming of natural gas generally includes a desulfurizing apparatus for preliminarily removing sulfur components from a raw material, a reforming reaction apparatus for converting natural gas into hydrogen-rich reformed gas by reacting the natural gas with steam, a water gas shift reaction apparatus selectively included therein and for removing carbon monoxide in the reformed gas, and a pressure swing adsorption apparatus for producing high quality hydrogen by removing other impurities and increasing a concentration of hydrogen.

Conventionally, after an adsorption step is performed at the time of pressure swing adsorption, the high purity hydrogen remaining in the adsorption bed through a depressurization process in a cocurrent direction of an equilibrium pressure and washing supply step is recovered, and a desorption step was performed in which the adsorbed impurities are removed through an additional cocurrent depressurization and a countercurrent depressurization as a post process. Specifically, the desorption step is performed by first performing cocurrent depressurization that performs depressurization in the same direction as a flow direction of a reformed gas introduced into the adsorption bed and then performing a countercurrent depressurization that performs depressurization in a direction opposite to the flow direction of the reformed gas.

The reason is that if the cocurrent depressurization is excessively performed and a pressure of the adsorption bed drops below a certain pressure, the amount of impurities desorbed per unit pressure is high, so that the adsorption bed is contaminated and the purity of hydrogen may be lowered. In this case, the high purity hydrogen remaining in a space of a zeolite layer at the time of countercurrent depressurization is not recovered to a final product and is lost.

The present invention is to prevent the loss of high purity hydrogen gas generated in the desorption step and to prevent the adsorption bed from being contaminated with impurities. According to the present invention, in the desorption step, the contamination of the adsorption bed due to the impurities may be prevented, and conventionally lost high purity hydrogen gas may be recovered, thereby increasing process efficiency.

Specifically, according to an exemplary embodiment of the present invention, a pressure swing adsorption process of a hydrogen production system comprising a desulfurization process for removing sulfur components from raw natural gas; a reforming reaction process for producing a reformed gas containing hydrogen generated by the reaction of natural gas through the desulfurization process and steam; and a pressure swing adsorption process of concentrating the hydrogen using a pressure swing adsorption from the reformed gas is provided. The pressure swing adsorption process includes: an adsorption step of adsorbing impurities while introducing the reformed gas into the adsorption bed pressurized with an adsorption pressure to produce a hydrogen product; and a desorption step of depressurizing an internal pressure of the adsorption bed to a desorption pressure and performing a recovery of remaining hydrogen and desorption of impurities, and in the desorption step, a cocurrent depressurization and a countercurrent depressurization are simultaneously performed.

Since specific process aspects of the desulfurization process and the reforming reaction process are not limited to specific aspects and may be performed according to the known desulfurization process and reforming reaction process, a detailed description thereof will be omitted herein.

In the pressure swing adsorption process according to an exemplary embodiment of the present invention, since the cocurrent depressurization and the countercurrent depressurization are simultaneously performed in the desorption step, it is possible to solve the problem that high purity hydrogen gas remaining in the adsorption bed is lost during the countercurrent depressurization by conventionally performing the depressurization in the order of cocurrent depressurization and countercurrent depressurization, and to prevent the contamination of the adsorption bed due to the excessive cocurrent depressurization.

Before describing the desorption step in more detail, the process configuration of the pressure swing adsorption process according to an exemplary embodiment of the present invention will be first described with reference to FIG. 1 to facilitate understanding of the present invention. However, such a description is intended to facilitate understanding of the present invention and the present invention is not limited thereto.

Figure 1:
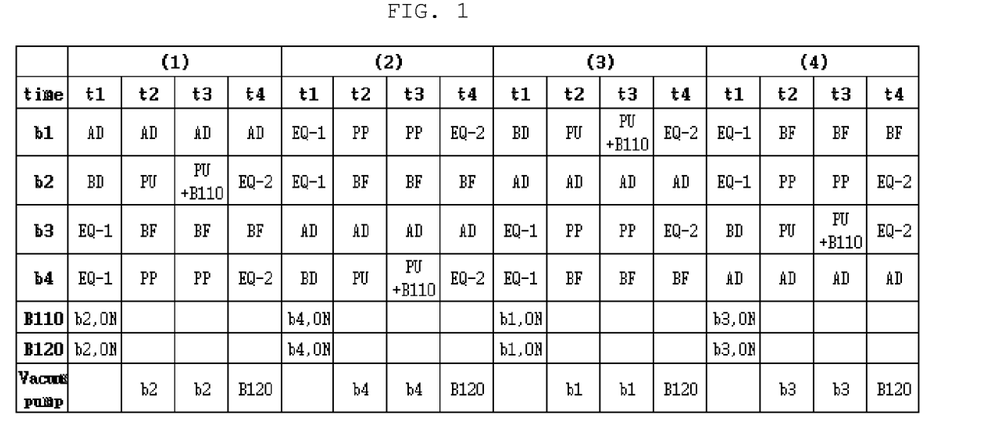
FIG. 1 is an illustrative process configuration of a pressure swing adsorption process according to an exemplary embodiment of the present invention.

Referring to FIG. 1, the pressure swing adsorption process according to an exemplary embodiment of the present invention may be performed using, for example, four adsorption beds b1, b2, b3, and b4. However, the number of adsorption beds is merely an example, and the pressure swing adsorption process according to an exemplary embodiment of the present invention may be performed using a plurality of adsorption beds of any of any multiple of four, such as four, eight, twelve, and the like, may be performed using an odd number of adsorption beds within a range in which the process aspect may be changed, and may be changed without limitation.

Hereinafter, an exemplary process aspect will be described based on a process aspect of b4.

In FIG. 1, process configurations (1) to (4) may be repeatedly performed. An adsorption bed b4 after completion of an adsorption step (AD) in process configurations (4)-t1 to (4)-t4 for producing a high purity hydrogen product by adsorbing impurities such as carbon dioxide, methane, carbon monoxide, and the like while introducing the reformed gas into the adsorption bed pressurized by the adsorption pressure is primarily depressurized in the cocurrent direction by passing through a first pressure equalization step (EQ-1) in communication with the other adsorption bed b3 to which a pressurization step BF is to be performed in order to perform the adsorption step, and is secondarily depressurized in the cocurrent direction through a first cleaning and supplying step in which a portion of the high purity hydrogen gas remaining in the adsorption bed b4 is supplied to an adsorption bed b2 in which a desorption step is completed with a cleaning gas (PP of a process configuration (1)-t2). Subsequently, the adsorption bed b2 may be cleaned through a second cleaning and supplying step in which the high purity hydrogen gas stored in a buffer tank B110 is supplied to the adsorption bed b2 together with the gas obtained from the adsorption bed b4 by communicating the buffer tank B110 with the adsorption bed b2 (b4: PP of a process configuration (1)-t3, b2: PU+B110 of a process configuration (1)-t3). After the above-mentioned step is completed, a second pressure equalization step (EQ-2) is performed by closing a valve connected to the adsorption bed b2 and the buffer tank B110 and connecting only the adsorption bed b4 and the adsorption bed b2 to each other, and the depressurization is continuously performed in the cocurrent direction.

To summarize the depressurization process again, the adsorption bed b4 is cocurrent-depressurized through the first pressure equalization step (EQ-1), the first cleaning and supplying step (PP of a process configuration (2)-t2), the second cleaning and supplying step (PP of a process configuration (2)-t3), and the second pressure equalization (EQ-2) after the completion of the adsorption step (AD).

After the second pressure equalization step (EQ-2), a desorption step (BD) through additional depressurization is performed, and in the present desorption step (BD), the high purity hydrogen gas still remaining in the adsorption bed may be recovered and the adsorbed impurities may be desorbed and removed. Thereafter, the adsorption bed b4 is again subjected to a series of steps (process configurations (2)-t2 to (3)-t4 in FIG. 1) for performing the adsorption step (AD).

In the pressure swing adsorption process according to an exemplary embodiment of the present invention, since the cocurrent depressurization and the countercurrent depressurization are simultaneously performed in the desorption step, it is possible to solve the problem that high purity hydrogen gas remaining in the adsorption bed is lost during the countercurrent depressurization by conventionally performing the depressurization in the order of cocurrent depressurization and countercurrent depressurization in the desorption step (BD), and to prevent the contamination of the adsorption bed due to the excessive cocurrent depressurization.

Specifically, in a case in which the cocurrent depressurization to a constant pressure is first performed and the countercurrent depressurization is performed to prevent the contamination of impurities in the adsorbent bed from the time when the adsorbed impurities in the adsorption bed start to be desorbed excessively, the high purity hydrogen gas remaining on an upper end of the adsorption bed may not be recovered to the product during the countercurrent depressurization and may be lost.

However, in the pressure swing adsorption process according to the exemplary embodiment of the present invention, since the cocurrent depressurization and the countercurrent depressurization are simultaneously performed, the process efficiency may be improved by minimizing the loss of the high purity hydrogen gas remaining in the adsorption bed in the desorption step and improving the recovery rate of the hydrogen gas.

More specifically, in the hydrogen production system through reforming of natural gas, the reformed gas may contain, for example, 3 to 6%, more specifically 4 to 5% of methane, 1 to 4% of carbon monoxide, 10 to 30% of carbon dioxide, and 65 to 85% of hydrogen by volume.

The hydrogen production system through reforming of natural gas further includes a water gas shift reaction process for removing carbon monoxide from the reformed gas before the pressure swing adsorption process to first remove carbon monoxide before performing the pressure swing adsorption, thereby making it possible to more easily remove the impurities in the pressure swing adsorption process, which is a post-process. Components of the reformed gas as described above may be a composition in a case in which the water gas transition reaction is not additionally performed or may be a composition in a case in which the water gas transition reaction process is additionally performed depending on a purification environment.

The pressure swing adsorption process according to the exemplary embodiment of the present invention may use the adsorption bed in which a lower end thereof, which is a direction into which the reformed gas is introduced, is filled with activated carbon, and an upper end thereof is filled with zeolite. As a result, carbon dioxide may be mainly adsorbed and removed from an activated carbon layer, and methane and carbon monoxide may be mainly removed from a zeolite layer. In the pressure swing adsorption process according to the exemplary embodiment of the present invention, physical properties and kinds of the activated carbon and the zeolite are not limited to a specific range, and the activated carbon and the zeolite may be employed without limitation as long as they may remove carbon dioxide, methane, and carbon monoxide from the reformed gas. Examples of the activated carbon include, but are not limited to, activated carbon fibers (ACF) which are excellent in the ability to adsorb carbon dioxide, carbon molecular sieves, and activated carbons in which micropores are developed. Examples of the zeolite include but are not limited to, zeolite-X, zeolite-Y, zeolite-A, and zeolite-LSX (low silica X), which are excellent in adsorbability of methane and carbon monoxide.

In this case, when the depressurization is performed in the order of cocurrent depressurization and the countercurrent depressurization in the desorption step (BD) as in the conventional way, since the amount of carbon dioxide desorbed from the activated carbon layer is small until the certain depressurization pressure, the contamination of the adsorbent bed due to the depressurization is not serious. However, in a case in which the adsorption bed is depressurized below the certain depressurization pressure, since the amount of carbon dioxide desorbed per unit pressure is increased, the contamination of the adsorption bed may become serious. For this reason, the cocurrent depressurization is performed up to the certain depressurized pressure, and the countercurrent depressurization is then performed to remove the impurities such as the desorbed carbon dioxide, methane, and carbon monoxide together with the hydrogen remaining in the zeolite layer. As a result, the high purity hydrogen gas remaining in the zeolite layer is not recovered to the product and is lost, and the recovery rate of hydrogen is lowered.

It is possible to solve the problem that high purity hydrogen gas remaining in the zeolite layer is discarded as in the related art by simultaneously performing the depressurization at the upper end and the lower end of the adsorption bed through the simultaneous depressurization in the desorption step according to the exemplary embodiment of the present invention.

The high purity hydrogen gas recovered as described above may be transferred to a product storage tank and be commercialized, and may be used as a cleaning gas in a cleaning step of the adsorption bed to contribute to improve process efficiency, stabilize fluctuation of a flow rate, and increase economical efficiency.

A specific process condition of the process swing adsorption process according to the exemplary embodiment of the present invention, an adsorption pressure of the adsorption step (AD) may be 0 to 30 bar, more specifically, 10 to 30 bar. The depressurization pressure in the first and second cleaning and supplying steps may be 1 to 5 bar, more specifically, 1 to 3 bar. However, the present invention is not limited thereto.

A range of a specific depressurization pressure in the pressure swing adsorption process according to the exemplary embodiment of the present invention will be described in more detail. When the adsorption bed is first cocurrent-depressurized through the first pressure equalization step (EQ-1), the first cleaning and supplying step (PP of the process configuration (1)-t2 and the like), the second cleaning and supplying step (PP of the process configuration (1)-t3 and the like), and the second pressure equalization step (EQ-2) after the completion of the adsorption step (AD), the depressurization pressure finally reached after the four steps may be 10 to 30% of the adsorption pressure. More specifically, the depressurization pressure finally reached after the four steps may be 15 to 25% of the adsorption pressure.

In addition, the depressurization pressures of the cocurrent depressurization and the countercurrent depressurization in the desorption step (BD) in which the cocurrent depressurization and the countercurrent depressurization are simultaneously performed may be the same as or different from each other, and as a specific example, the depressurization pressures of the cocurrent depressurization and the countercurrent depressurization may be the same as each other. When the depressurization pressures are performed to be the same as each other, the depressurization pressures of the cocurrent depressurization and the countercurrent depressurization may be a pressure of 1 to 20% of the adsorption pressure. Here, the depressurization pressures of the cocurrent depressurization and the countercurrent depressurization refer to the pressure finally reached after the depressurization. Such a depressurization pressure may be more specifically 4 to 10%, or 5 to 9% of the adsorption pressure.

In addition, in the pressure swing adsorption process according to the exemplary embodiment of the present invention, when the depressurization in the desorption step (BD) is performed at a pressure higher than atmospheric pressure, a step of additionally depressurizing the adsorption bed through countercurrent depressurization may be further performed. The depressurization pressure in such a step may be 0 to 1.5 bar, or 0.5 to 1.5 bar, more specifically, a pressure depressurized up to atmospheric pressure, but is not limited thereto.

A ratio of the depressurization pressure when the adsorption bed is cocurrent-depressurized through the first pressure equalization step (EQ-1), the first cleaning and supplying step (PP of the process configuration (1)-t2, and the like), the second cleaning and supplying step (PP of the process configuration (1)-t3, and the like), and the second pressure equalization step (EQ-2) may correspond to the content in the reformed gas of the carbon dioxide impurity adsorbed in the activated carbon layer filled in the lower end of the adsorption bed, and a ratio of the depressurization pressure of the cocurrent depressurization and the countercurrent depressurization which are performed in the same range in the desorption step (BD) may correspond to the content in the reformed gas of the methane and carbon monoxide impurities adsorbed in the zeolite layer filled in the upper end of the adsorption bed.

In the case in which the cocurrent depressurization is performed up to the second pressure equalization step (EQ-2) in the above-mentioned range, and the desorption step (BD) simultaneously performing the cocurrent depressurization and the countercurrent depressurization is then performed, since it is possible to prevent the impurities desorbed per unit depressurization pressure from rapidly increasing due to the depressurization pressure that excessively falls, the contamination of the adsorption bed may be prevented in the desorption step, and the contamination of the recovered high purity hydrogen gas remaining in the adsorption bed may be prevented.

The pressure swing adsorption process according to the exemplary embodiment of the present invention further includes a first cleaning step and a second cleaning step. The first cleaning step may be performed (PU+B110) by being simultaneously supplied with the gas in the adsorption bed for which the first pressure equalization step is performed and the hydrogen gas recovered in the desorption step, and the second cleaning step may be performed (PU) by being supplied with the gas in the adsorption bed for which the first pressure equalization step is performed.

In the case of performing the first and second cleaning steps as described above, since the cleaning is performed with only the gas in the adsorption bed after the completion of the first pressure equalization step of the present invention including the hydrogen gas of higher purity than the high purity hydrogen gas stored in the buffer tank B110 in the second cleaning step which is performed as the post process of both cleaning steps, the purity of a final hydrogen gas product recovered through the pressure swing adsorption my be further improved.

According to an exemplary embodiment of the present invention, a pressure swing adsorption apparatus of a hydrogen production system comprising a desulfurizing apparatus for removing sulfur components from a raw natural gas; a reforming reaction apparatus for manufacturing a reformed gas including hydrogen produced by a reaction of the natural gas through the desulfurizing apparatus and steam; and a pressure swing adsorption apparatus for concentrating hydrogen using a pressure swing adsorption from the reformed gas is provided. The pressure swing adsorption apparatus includes an adsorption bed and two ore more buffer tanks connected to a lower end and an upper end of the adsorption bed, respectively.

The pressure swing adsorption apparatus may implement the pressure swing adsorption process according to the exemplary embodiment of the present invention described above.

Specifically, the pressure swing adsorption apparatus according to an exemplary embodiment of the present invention includes the two or more buffer tanks connected to the lower end and the upper end of the adsorption bed, respectively, to thereby simultaneously implement the cocurrent depressurization and the countercurrent depressurization when the desorption step is performed, thereby making it possible to implement the advantage of the pressure swing adsorption process according to the exemplary embodiment of the present invention.

The pressure swing adsorption apparatus according to an exemplary embodiment of the present invention may selectively further include a water gas transition reaction apparatus for removing carbon monoxide in the reformed gas, but is not limited thereto.

The desulfurizing apparatus, the reforming reaction apparatus, and the water gas transition reaction apparatus may employ the known apparatuses, but are not limited to specific apparatuses.

Hereinafter, the pressure swing adsorption process and apparatus will be described in more detail with reference to FIGS. 2 to 5. FIGS. 2 to 5 illustrate a case in which the number of adsorption beds is four, but is an example to facilitate understanding of the present invention, and the present invention is not limited thereto.

The pressure swing adsorption apparatus according to the exemplary embodiment of the present invention may include an adsorption bed in which a lower end thereof into which the reformed gas is introduced is filled with activated carbon, and an upper end thereof is filled with zeolite.

Therefore, carbon dioxide in the reformed gas is adsorbed and removed by the activated carbon, and methane and carbon monoxide in the reformed gas may be adsorbed and removed by the zeolite.

FIGS. 2 to 5 sequentially illustrate the process configurations from the process configuration (1)-t1 to the process configuration (1)-t4 among the processes of FIG. 1. In the processes (2) to (4) of the processes of FIG. 1, the adsorption bed is changed to repeatedly perform the process configuration (1). The pressure swing adsorption process and apparatus according to the exemplary embodiment of the present invention will be described based on the process configuration (1).

Figure 2:
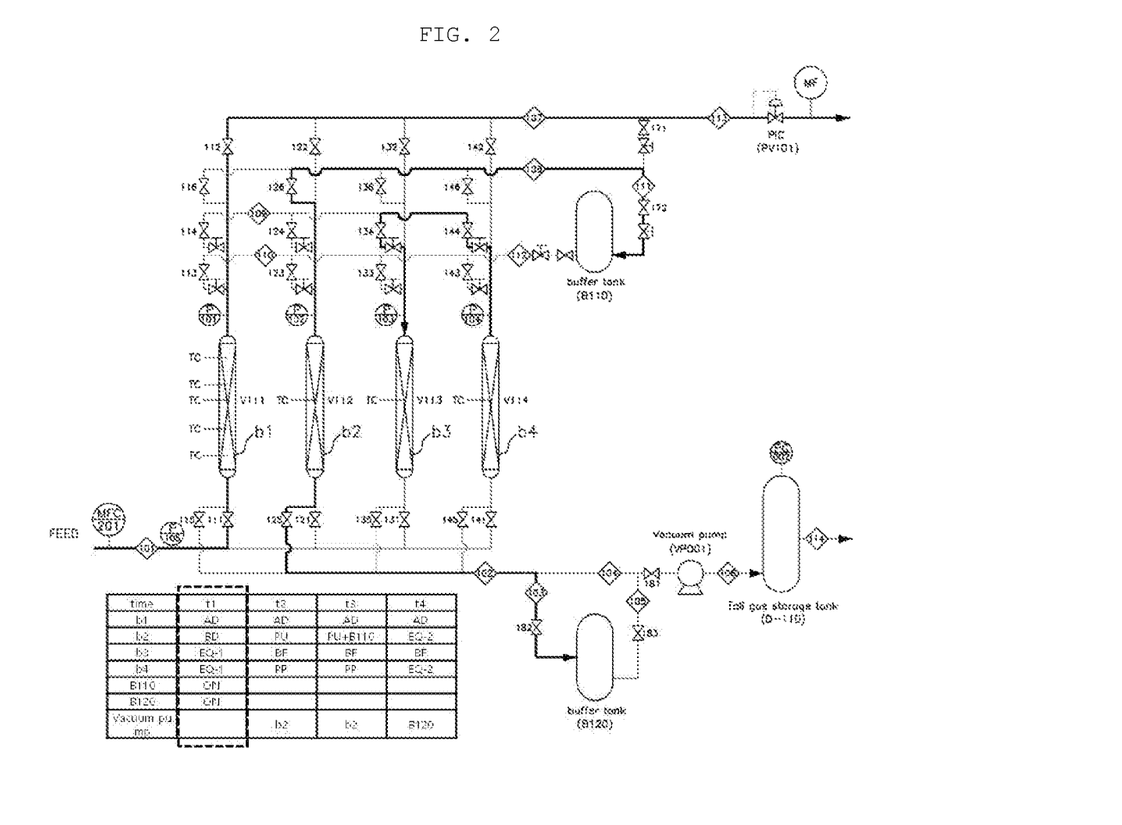
FIG. 2 is a view of illustrating an aspect performing a pressure swing adsorption process and a pressure swing adsorption apparatus according to an exemplary embodiment of the present invention.

FIG. 2 illustrates a process example of the process configuration (1)-t1 of FIG. 1, in which the adsorption bed b1 performs the adsorption step (AD), the adsorption bed b2 performs the desorption step (BD), and the adsorption bed b3 and the adsorption bed b4 after the completion of the adsorption step are in communication with each other to perform the first pressure equalization step (EQ-1). In the first pressure equalization step (EQ-1), the adsorption bed b4 after the completion of the adsorption step is depressurized.

Here, the adsorption bed b2, which is in the desorption step (BD), is in communication with the buffer tanks B110 and B120 such that the cocurrent depressurization and the countercurrent depressurization are simultaneously performed. As a result, the conventional problems as described above may be solved, thereby preventing the contamination of the adsorption bed and recovering the high purity hydrogen gas remaining in the zeolite layer to the buffer tanks.

Here, the buffer tanks B110 and B120 may pre-depressurized to a target desorption pressure, and as a result, the adsorption bed b2 and the buffer tanks B110 and B120 may be in communication with each other to depressurize the adsorption bed b2.

Figure 4:
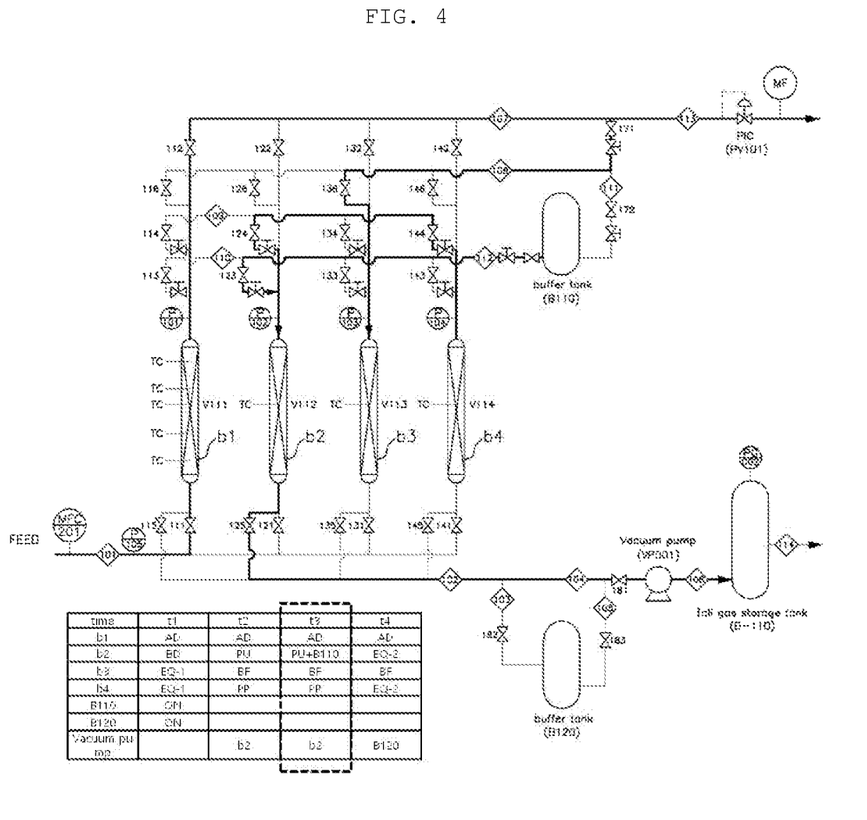
FIG. 4 is a view of illustrating an example of performing a pressure swing adsorption process and a pressure swing adsorption apparatus according to an exemplary embodiment of the present invention.

The high purity hydrogen gas recovered to the buffer tanks may be transferred to a tank storing a product to be recovered to a final product, or may be used as a cleaning gas cleaning the adsorption bed b2 as illustrated in FIG. 4. In order to prevent the contamination in the adsorption bed, it is preferable to typically perform the cleaning with a high purity product gas. According to the present invention, since the product gas that was discarded in the conventional countercurrent depressurization is used as the cleaning gas, a recovery rate of the product gas may be improved and process efficiency may be increased.

Figure 3:
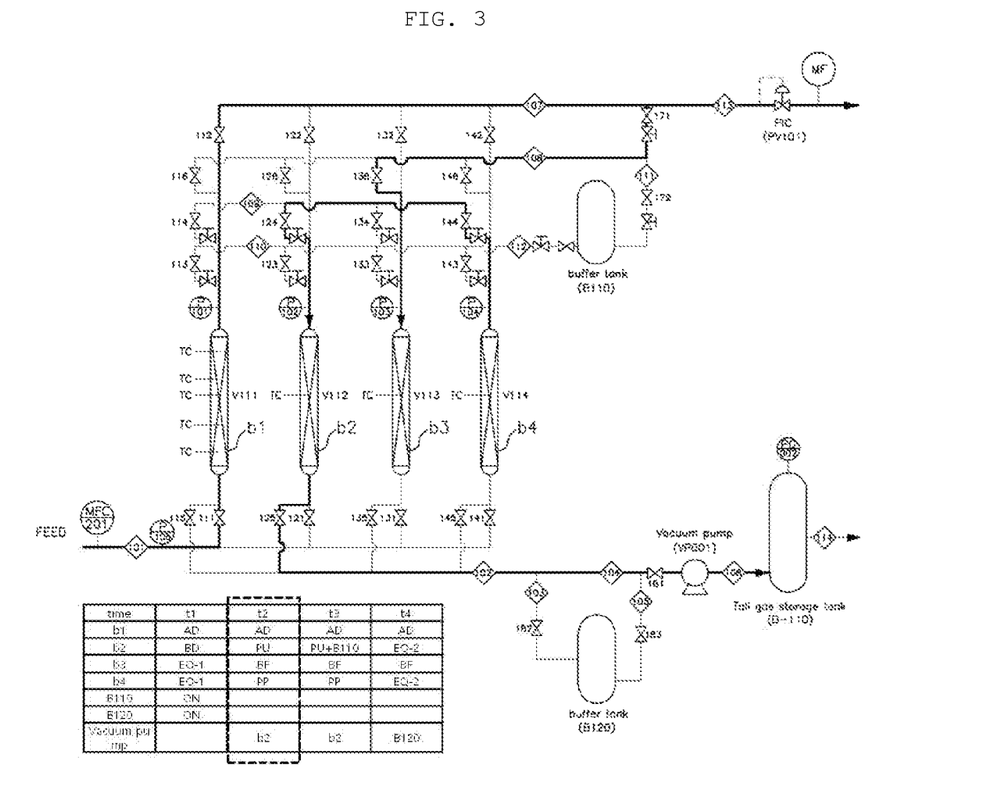
FIG. 3 is a view of illustrating an example of performing a pressure swing adsorption process and a pressure swing adsorption apparatus according to an exemplary embodiment of the present invention.

FIG. 3 illustrates a process example of the process configuration (1)-t2 of FIG. 1, in which the adsorption bed b1 continues to perform the adsorption step (AD), and the adsorption bed b2 after the completion of the desorption step (BD) performs the first cleaning step of communicating with the adsorption bed b4 to be supplied with the gas in the adsorption bed b4 as the cleaning gas and desorbing impurities (b2: PU, b4: PP). Here, the adsorption bed b4 is depressurized through the first cleaning and supplying step (PP of t2). Here, in the PU step, the adsorption bed b2 is pressurized, and a pressurization pressure thereof may be 0.1 to 1.5 bar, but is not limited thereto. The adsorption bed b3 is supplied with the production gas and is pressurized as a preparation step for performing the adsorption step (AD).

FIG. 4 illustrates a process example of the process configuration (1)-t3 of FIG. 1, in which the adsorption bed b1 continues to perform the adsorption step (AD), and the adsorption bed b2 performs the second cleaning step of communicating with the adsorption bed b4 and the buffer tank B110 to be supplied with the high purity hydrogen gas from the buffer tank B110 as the cleaning gas (b2: PU+B110, b4: PP). Here, the adsorption bed b4 is depressurized through the second cleaning and supplying step (PP of t3). Here, in the PU+B110 step, the adsorption bed b2 is pressurized, and a pressurization pressure thereof may be 0.1 to 1.5 bar, but is not limited thereto. The adsorption bed b3 is supplied with the production gas and is pressurized (BF) as a preparation step for continuously performing the adsorption step (AD).

Figure 5:
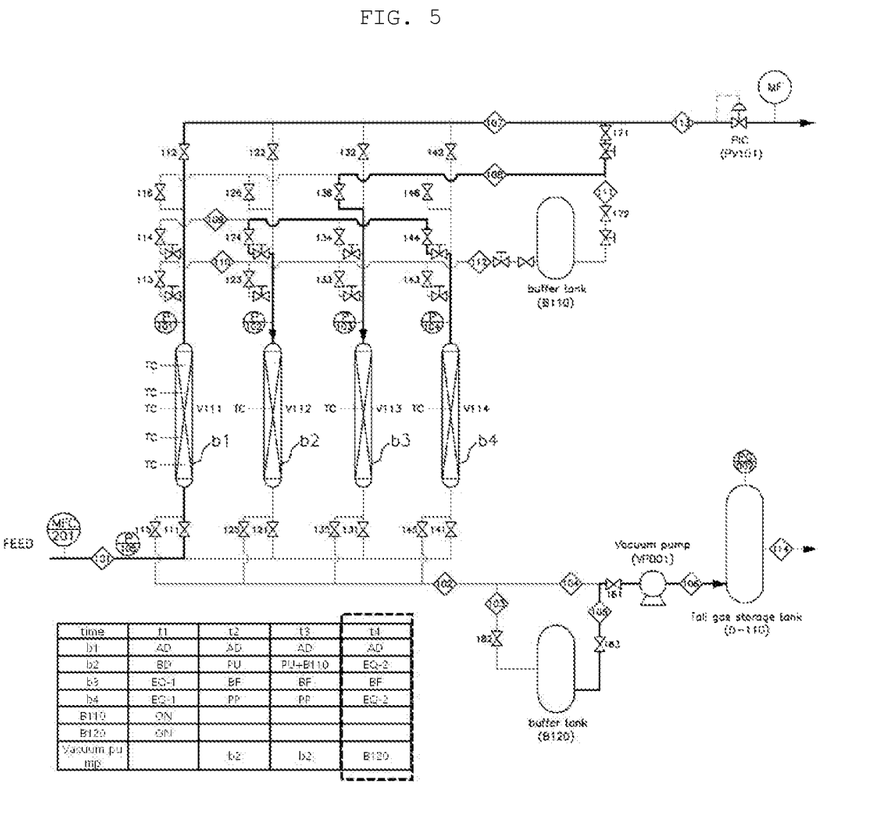
FIG. 5 is a view of illustrating an example of performing a pressure swing adsorption process and a pressure swing adsorption apparatus according to an exemplary embodiment of the present invention.

FIG. 5 illustrates a process example of the process configuration (1)-t4 of FIG. 1, in which the adsorption bed b1 continues to perform the adsorption step (AD) and the second adsorption bed b2 is in communication with the adsorption bed b4 to perform the second pressure equalization step (EQ-2) and is partially pressurized. Here, the adsorption bed b4 is in communication with the adsorption bed b2 and is partially depressurized. The adsorption bed b3 is supplied with the production gas and is pressurized (BF) as a preparation step for continuously performing the adsorption step (AD).

Figure 6:
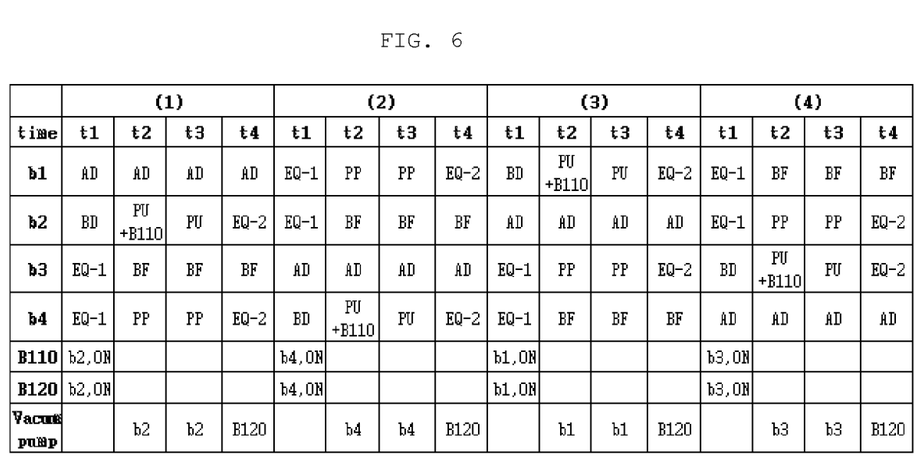
FIG. 6 is an illustrative process configuration of a pressure swing adsorption process according to an exemplary embodiment of the present invention.

FIG. 6 is another example of the pressure swing adsorption process according to the exemplary embodiment of the present invention. Another example of the pressure swing adsorption process corresponds to a modified example of the pressure swing adsorption process according to the exemplary embodiment of the present invention illustratively described in FIGS. 2 to 5. In the processes (2) to (4) of the processes of FIG. 6, the adsorption bed is changed to repeatedly perform the process configuration (1). The pressure swing adsorption process according to another exemplary embodiment of the present invention will be described based on the difference with the pressure swing adsorption process according to the exemplary embodiment of the present invention described with reference to FIGS. 2 to 5.

The pressure swing adsorption process of FIG. 6 performs the first cleaning step and the second cleaning step in the same way as the pressure swing adsorption process of FIGS. 2 to 5. More specifically, as the first cleaning step, the adsorption bed b2 after the completion of the desorption step (BD) is in communication with the adsorption bed b4 after the completion of the first pressure equalization step and the buffer tank 110 to be supplied with the gas in the adsorption bed b4 and the high purity hydrogen gas stored in the buffer tank B110 as the cleaning gas, and desorbs the impurities (b2: PU+B110, b4: PP). Thereafter, as the second cleaning step, the adsorption bed b2 disconnects the communication with the buffer tank B110 and is in communication with only the adsorption bed b4 to be supplied with the gas in the adsorption bed b4 as the cleaning gas, and desorbs the impurities.

In the case of performing the first and second cleaning steps as described above, since the cleaning is performed with only the gas in the adsorption bed b4 including the hydrogen gas of higher purity than the high purity hydrogen gas stored in the buffer tank B110 in the second cleaning step which is performed as the post process of both cleaning steps, the purity of a final hydrogen gas product recovered through the pressure swing adsorption may be further improved.

According to the pressure swing adsorption process and the pressure swing adsorption apparatus according to the exemplary embodiment of the present invention, in the pressure swing adsorption process which is one process of the hydrogen production systems through reforming of natural gas, it is possible to improve the process efficiency by depressurizing the internal pressure of the adsorption bed to the desorption pressure, reducing the contamination of the adsorption bed in the desorption step of performing the recovery of residual hydrogen and the desorption of impurities, and recovering high purity hydrogen remaining in the zeolite layer which is lost during the conventional process operation and is not recovered to a product to thereby increase the recovery rate.

What is claimed is:

1. A pressure swing adsorption process of a hydrogen production system comprising:
    a desulfurization process for removing sulfur components from a raw natural gas;
    a reforming reaction process for producing a reformed gas containing hydrogen generated by the reaction of the natural gas through the desulfurization process and steam; and
    a pressure swing adsorption process of concentrating the hydrogen using a pressure swing adsorption from the reformed gas,
    wherein the pressure swing adsorption process is performed using a plurality of adsorption beds,
    wherein the pressure swing adsorption process includes:
        an adsorption step of adsorbing impurities while introducing the reformed gas into a first adsorption bed pressurized with an adsorption pressure to produce a hydrogen product;
        a first pressure equalization step, a first cleaning and supplying step, a second cleaning and supplying step, and a second pressure equalization step which are sequentially performed after the adsorption step and perform a cocurrent depressurization of the first adsorption bed; and
        a desorption step which is performed after the second pressure equalization step, depressurizes an internal pressure of the first adsorption bed to a desorption pressure, and performs a recovery of remaining hydrogen and desorption of the impurities, and
    wherein in the desorption step, a cocurrent depressurization and a countercurrent depressurization are simultaneously performed.

2. The pressure swing adsorption process of claim 1, wherein in the first pressure equalization step, the first adsorption bed is in communication with a second adsorption bed which is to be subjected to a pressurization step to pressurize the second adsorption bed, and the first adsorption bed is cocurrent-depressurized,
    wherein in the first cleaning and supplying step, a hydrogen gas remaining in the first adsorption bed is supplied to a third adsorption bed after completion of the desorption step, and the first adsorption bed is cocurrent-depressurized,
    wherein in the second cleaning and supplying step, the hydrogen gas remaining in the first adsorption bed and a hydrogen gas recovered in the desorption step are supplied to the third adsorption bed as a cleaning gas, and the first adsorption bed is cocurrent-depressurized, and
    wherein in the second pressure equalization step, after the second cleaning and supplying step, only the first adsorption bed and the third adsorption bed are in communication with each other, and the first adsorption bed is cocurrent-depressurized.

3. The pressure swing adsorption process of claim 1, wherein the pressure swing adsorption process uses an adsorption bed in which a lower end thereof, which is a direction into which the reformed gas is introduced, is filled with activated carbon, and an upper end thereof is filled with zeolite.

4. The pressure swing adsorption process of claim 1, wherein a depressurization pressure of the first adsorption bed after completion of the first pressure equalization step, the first cleaning and supplying step, the second cleaning and supplying step, and the second pressure equalization step is 10 to 30% of the adsorption pressure.

5. The pressure swing adsorption process of claim 1, wherein the cocurrent depressurization and the countercurrent depressurization in the desorption step are performed at a pressure of 1 to 20% of the adsorption pressure.

6. The pressure swing adsorption process of claim 1, wherein the reformed gas contains 3 to 6% of methane, 1 to 4% of carbon monoxide, 10 to 30% of carbon dioxide, and 65 to 85% of hydrogen by volume.

7. A pressure swing adsorption apparatus of a hydrogen production system comprising:
a desulfurizing apparatus for removing sulfur components from a raw natural gas;
a reforming reaction apparatus for producing a reformed gas including hydrogen produced by a reaction of the natural gas through the desulfurizing apparatus and steam; and
a pressure swing adsorption apparatus for concentrating the hydrogen using a pressure swing adsorption from the reformed gas,
wherein the pressure swing adsorption apparatus includes an adsorption bed and two or more buffer tanks connected to a lower end and an upper end of the adsorption bed, respectively,
wherein the pressure swing adsorption apparatus is configured to adsorb impurities while introducing the reformed gas into the adsorption bed pressurized with an adsorption pressure to produce a hydrogen product,
wherein the pressure swing adsorption apparatus is further configured to sequentially perform, after adsorbing impurities, a first pressure equalization step, a first cleaning and supplying step, a second cleaning and supplying step, and a second pressure equalization step, and a cocurrent depressurization of the adsorption bed,
wherein the pressure swing adsorption apparatus is further configured to perform a desorption step after the second pressure equalization step, depressurization of an internal pressure of the adsorption bed to a desorption pressure, and a recovery of remaining hydrogen and desorption of the impurities, and
wherein the pressure swing adsorption apparatus is further configured to simultaneously perform a cocurrent depressurization and a countercurrent depressurization.

8. The pressure swing adsorption apparatus of claim 7, wherein the adsorption bed has the lower end thereof, into which the reformed gas is introduced, filled with activated carbon, and the upper end thereof filled with zeolite.

9. The pressure swing adsorption apparatus of claim 7, wherein the pressure swing adsorption apparatus further includes a water gas transition reaction apparatus for removing carbon monoxide in the reformed gas.

* * * * *